V. VON SCHLEGELL.
CAR CONSTRUCTION.
APPLICATION FILED JULY 12, 1913.
1,226,035.
Patented May 15, 1917.
2 SHEETS—SHEET 1.
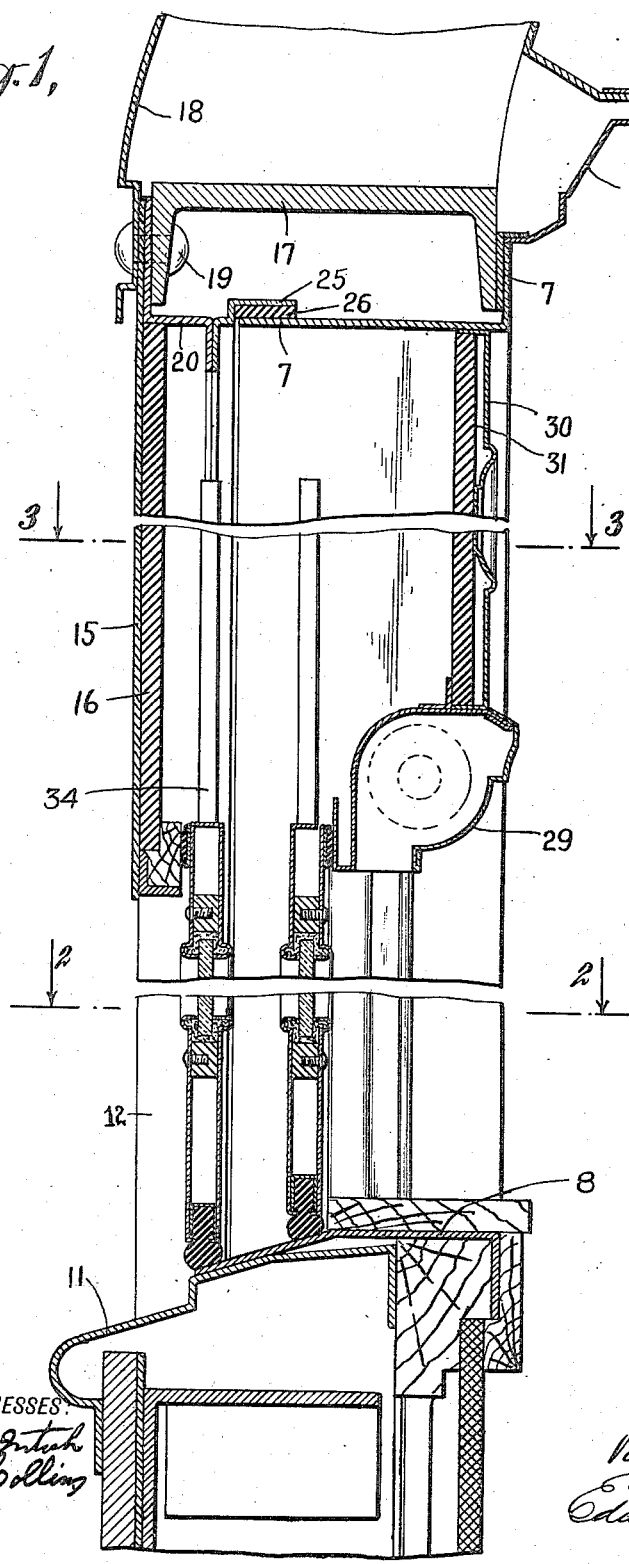
Fig. 1,
WITNESSES
INVENTOR
Victor von Schlegell
BY
Edmunds & Edmunds
ATTORNEY

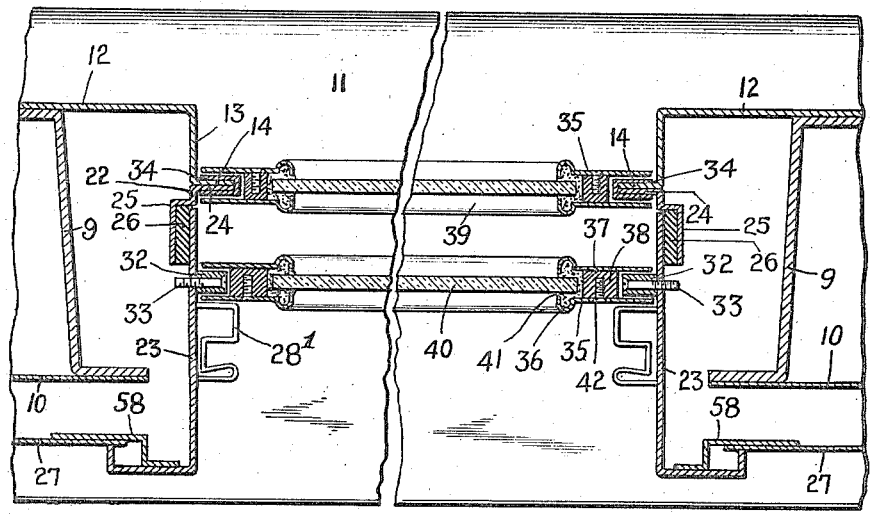
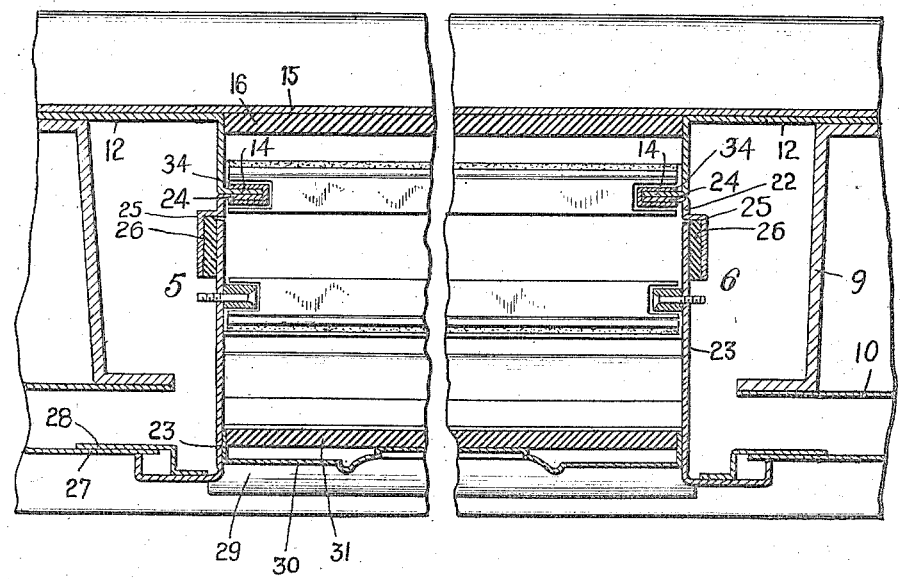

UNITED STATES PATENT OFFICE.

VICTOR von SCHLEGELL, OF NEW YORK, N. Y., ASSIGNOR TO HALE AND KILBURN COMPANY, OF PHILADELPHIA, PENNSYLVANIA, A CORPORATION OF DELAWARE.

CAR CONSTRUCTION.

1,226,035.     Specification of Letters Patent.     Patented May 15, 1917.

Application filed July 12, 1913. Serial No. 778,641.

*To all whom it may concern:*

Be it known that I, VICTOR VON SCHLEGELL, a citizen of the United States, residing in the city, county, and State of New York, have invented certain new and useful Improvements in Car Construction, of which the following is a specification.

This invention relates to the construction of railway cars and particularly to the portions of the side walls of passenger cars made largely of sheet-metal which include the windows. The object of the invention is to effect certain improvements in the construction of railway cars in this respect whereby more effective insulation of the walls of the car may be secured, whereby the window-frames will remain square and true throughout a long period of use so that the sashes will move freely but still be sufficiently tight, whereby the cost of assemblage of the parts of a car is greatly reduced and whereby repairs and repainting may be much more readily effected.

In accordance with the invention, the car wall is provided with openings for windows, and window-units are made up complete, apart from the erection of the car wall, and are inserted in the window-openings as an incident to the erection of the wall. The car wall comprises a plurality of vertically disposed posts spaced apart lengthwise of the car to provide window-openings between them and a sheathing of sheet-metal is applied to the exterior of the car wall, this sheathing having its edges projecting into the window-openings a short distance. The erection of the car wall having been completed, a complete window-unit is inserted into each window-opening from the interior of the car until the edges of the side members of the window-frame abut against the projecting edges of the sheathing which overlap the window opening. The window unit is then secured in position.

In accordance with the present invention an improved method of securing the window unit in its position in the opening is provided. The frame forming part of the window unit is made of sheet metal and the outer edges of the side members of this frame are flanged so as to provide surfaces which are adapted to abut against and lie closely beside the projecting edges of the sheathing of the car which overlap the window opening. The window unit is then secured in its position by sheet metal strips which embrace these coacting flanges of the sheathing and window frame so as to form binders which hold the window unit very rigidly to the sheathing of the car.

When the window unit is secured in an opening in the wall of a car in this manner, the abutting flanged edges of the sheathing and window frame, particularly when these are inclosed in channel binders, may be employed as guides upon which a sash may move vertically. When this construction is employed, the channel binder for the flanges on the sheathing and window frame not only serves to hold the window unit in its position, but also forms an effective weatherstrip for preventing the passage of air around the sides of the movable sash and a guide for the sash.

A further feature of the invention resides in so constructing the sashes as to greatly facilitate the assemblage of the parts for the wall of a car when the integral window construction, above referred to, is employed. In accordance with this feature of the invention, the movable sash consists of two rectangular frames adapted to lie side by side and to be secured together, and these two frames are so arranged that when secured together inclosing a panel of glass, the lateral edges of their side members lie on opposite sides of the flanges formed by the abutting portions of the outer sheathing and window frame, so that these flanges are embraced by the lateral edges of the sash. This construction reduces materially the cost of assemblage of the parts for a car. When the window unit has been placed in its position in a window opening and secured therein, as above described, one frame of a sash is placed in position with its side edges on one side of the flange which forms the guide for the sash and then the other frame is placed upon the opposite side, the panel of glass being placed between the two frames, and then these two frames are secured together side by side, but spaced apart a suitable distance. By this method the parts for the car wall, including the window frames and the frames for the sash, may be made up complete under conditions permitting manufacture thereof to the best advantage and thereafter these parts may be applied to their proper relative positions in the wall of a car and secured together at small expense.

The preferred embodiment of the invention is illustrated in the accompanying drawings in which Figure 1 is a vertical section through a window unit and adjacent parts of a railway car structure, broken away in part, and Figs. 2 and 3 are horizontal sectional views on lines 2—2 and 3—3 of Fig. 2.

Referring to these drawings, a window unit consists primarily of a rectangular window frame formed of frame members of pressed sheet metal which are rigidly connected at their ends, preferably by a welding operation. This frame consists of side members referred to generally by the reference characters 5 and 6, a top member 7 and a sill 8. This window frame with the various parts assembled therewith, including a curtain box, curtain guides, sheet metal panel and others, is made up complete under conditions specially adapted for the manufacture of such window units and is thereafter shipped to the car builder, or to the assembling tracks of a carbuilding plant, there to be inserted in an opening in the wall of a car and secured in position therein. The car wall is supported by a plurality of vertical posts suitably spaced apart lengthwise of the car; in the present instance these posts are shown as made from sheet metal. Each consists of a strip of sheet metal 9 (Figs. 2 and 3) bent along lines extending lengthwise thereof to form three sides of a rectangle and to provide edge flanges and a piece 10 of sheet metal is secured to these edge flanges by welding or riveting, to form the fourth side of each post. Figs. 2 and 3 are broken away so that only a part of each post is seen. The wall of the car between the posts may be built up to the level of the lower edges of the windows in any suitable manner, and on the upper edge of the wall between each pair of adjacent side posts a sub-sill 11 of any suitable configuration may be secured in the manner shown in Fig. 1. A sheathing of sheet metal is applied to the exterior of the car, this being secured to the posts 9. This sheathing is shown at 12. It is extended at its side edges so as to provide portions thereof which overlap the openings between the posts provided for the window units. In Figs. 2 and 3 these overlapping portions of the sheathing are shown as bent inwardly toward the interior of the car at 13 and then flanged at the extreme edges as shown at 14. An additional exterior sheathing 15 (Fig. 1) may be applied to the upper portion of the car wall, if desired, and under this suitable insulating material 16 may be provided. This exterior sheathing 15 is secured at its upper edge to a longitudinal frame member 17 and to the lower edges of the roof plates 18 in any suitable manner as by rivets 19. If desired a sheathing member 20 may be employed at the top of the window opening corresponding to the sheathing 12 at the sides of the opening, but this is not essential. On the interior of the car above the window openings a suitable cornice 21 is provided and the top member 7 of the window unit coacts therewith so as to make a neat joint.

In the construction of the window frame a sill 8 is employed consisting preferably of a single piece of sheet metal of the configuration shown in Fig. 1. Each of the side members of the window frame consists of two pieces of sheet metal as shown at 22 and 23 in Figs. 2 and 3. The piece 22 has a flange 24 at its outer edge corresponding in size and position to the flange 14 on the outer sheathing 12 of the car. At its other edge the metal of strip 22 is offset as shown at 25 and this portion of strip 22 is secured to the strip 23 with insulating material 26 inserted between the two. The inner edge of the strip 23 is turned laterally as shown so as to coact with the edge of a panel 27 adapted to fill the space between adjacent window units, the edge of this panel being received between the edge of strip 23 and securing strips 28 secured thereto. The side members of the frame thus constructed are rigidly secured to the sill 8 and also to top member 7 of the frame, which top member may be like the side members in construction as shown, or may be a simple sheet metal or angle iron strip connecting the upper ends of the side members so as to hold them at the requisite distance apart.

The side members of the frame have guides 28' secured thereto, these being formed from sheet metal strips bent to the configuration shown. These guides have grooves therein to receive the edges of a curtain which may be wound up upon a roller mounted within a sheet metal curtain box 29 extending between the side members of the frame and secured thereto. Between this curtain box 29 and the top member 7 of the frame is a sheet metal panel 30 pressed into form to embody an attractive design and flanged at its edges to coact with the curtain box 29, the top member 7 and the side members 5 and 6 of the window frame. Preferably insulating material 31 is inserted in position back of panel 30. The side members of the window frame also have guides 32 secured thereto for a vertically movable sash. These guides preferably consist of sheet metal strips and are secured to the side members of the frame by screws 33.

In the manufacture of a railway car in accordance with the invention, the car wall is completed with respect to the vertical posts, the entire roof structure, the portions of the wall between the posts up to the lower edges of the windows and the sub-sills 11. The window units are also made up complete in the form above described. To assemble the parts a complete window unit is passed into a window opening from the interior of the car until the flanges 24 on the side members of the frame abut against the flanges 14 on the outer sheathing 12. With these flanges abutting and the sill 8 of the frame resting upon the sub-sill 11, as shown in Fig. 1, the window frame is correctly positioned and it is then secured in that position. For this purpose I employ means for securing together the abutting flanges on the side member of the frame and the outer sheathing. Preferably these securing means consist of strips of sheet metal of channel section as shown at 34. These strips are caused to embrace the abutting flanges so as to bind them tightly together and thereby hold the window unit rigidly in position.

In addition to their function in securing the window units in position in the window openings, the binders 34 may be employed as weather strips and guides for vertically movable sashes. These strips are preferably made of brass or a similar non-corrosive metal upon which a sash will move freely without binding although a tight fit is made.

For coaction with the guides herein shown and described, I prefer to provide movable sashes of a special construction which greatly facilitate the assemblage of the parts of the car. In accordance with this feature of the invention, each sash consists of two rectangular sheet metal frames which are adapted to be secured together side by side. Each frame 35 for a sash consists of four pieces of sheet metal secured together at their ends and each having a bead 36 at its inner edge. Three of these pieces may be of the same width and the piece for the bottom of the frame of substantially greater width as is shown in Fig. 1. To one of the frames for a sash, such as the frame 37 in Fig. 2, spacers 38 are secured along the inner side of the frame. These spacers 38 may be metal bars or blocks or sheet metal channels extending lengthwise of the frame members, and they may be secured to the frame in any suitable manner, as, for instance, by welding them thereto. These frames for a sash having been made up complete, the two adjacent frames 37 and 39 of the two sashes shown in Fig. 2 are placed in position in coaction with the guides therefor. The frame 35 is then placed in position with the edges of its side members coacting with the opposite sides of the guides 32, a panel of glass 40 being placed in position between the two frames 37 and 35. Preferably a gasket 41 is placed about the edges of this panel. The two frames of a sash are then secured together in any suitable manner as, for instance, by screws 42 passing through openings in the frame 35 and entering threaded openings in the spacers 38. The parts of the other sash may then be assembled in the same manner with the side edges of the frames of that sash lying on opposite sides of the channel binders 34 which constitute guides for the movable sash.

This construction permits of manufacturing the window frames and the sashes therefor under conditions permitting of the manufacture of these parts to the best advantage. Furthermore, it is such that the relative positions of the parts of the window frame are wholly independent of inaccuracies in the spacing and alinement of the posts of the car wall, and for this reason better operation of the sashes in their vertical movement is obtainable for the sagging of the parts of the car walls incident to use of the car cannot alter the shape of the window frames and thus cause binding or looseness of the sashes. The special means herein shown for securing the window units in position in the car wall is particularly useful in that it is reliable and effective in holding the unit rigidly in position and in that it avoids the use of a separate weather-strip. The improved form of sash consisting of two frames secured together with the edges of the side members thereof embracing the guides for the sash, permits of the complete manufacture of the parts for a sash independently of the other parts of the car wall and application of these completed parts to the coacting parts of the car wall after the assemblage of the latter has been completed.

This construction also facilitates the efficient insulation of the car wall. It will be noted that the side-members of the window-frame which constitute the post-casings are not secured directly to the posts but on the contrary are spaced from the posts and are secured to the overlapping edges of the sheathing. This affords ample space around the posts and between them and the post-casings for the insertion of the necessary insulation. Furthermore, this construction relieves the window-frame from strain tending to distort it when the posts sag or move relatively slightly as they frequently do under the strains incident to use of the car. Such strain on the window-frame would be very objectionable since it might cause the frame to be altered from its true shape in which event the sashes would bind. Also, it is to be noted that the two pieces 22 and 23 of the side-members of the window-frame are joined together with insulation between them at a point between the two parallel sashes. This arrangement of the insulating joint in the side-members of the frame relatively to the two sashes is very effective in preventing the passage of heat through the wall of the car.

Having described my invention, what I claim as new therein and desire to secure by Letters Patent of the United States, is:

1. In a structure of the character described, having a wall with a window opening therein, the combination of an outer sheet-metal sheathing secured to the wall and having its edges overlapping the opening, a sheet-metal window-frame in said opening having flanges at its side edges adapted to abut against said overlapping edges of the sheathing in parallel relation thereto, and a vertically movable sash in said window-frame having grooves in its side edges in which said abutting portions of the overlapping edges of the sheathing and the flanges of the window-frame are received, said abutting portions serving as guides for the sash, substantially as set forth.

2. In a structure of the character described, having a wall with a window opening therein, the combination of an outer sheathing of sheet-metal secured to the wall and having its edges overlapping the opening, a window-frame in said opening having the side members thereof formed of sheet-metal and flanged at their outer edges so that when the window-frame is moved into the opening therefor from the interior of the structure said flanges will engage said overlapping edges of the sheathing, sheet-metal strips embracing the abutting edges of the sheathing and the flanges of the frame, and a sash in said window-frame movable vertically upon the said strips, substantially as set forth.

3. In a structure of the character described, having a wall with an opening therein, the combination of an integral window frame adapted to be removably mounted in said opening, said frame having sheet-metal side members, a sill and a top member secured together at their ends, and two sashes mounted side by side in said window-frame, each of the side members of said frame being formed of inner and outer sheet-metal strips secured together at their edges with insulating material between them and the insulated joint between the said two pieces lying between the two sashes of the frame, substantially as set forth.

4. In window construction, the combination of a pair of wall members spaced apart to form an opening, and having flanged edges extending laterally into said opening, a window frame comprising side members having flanges adapted to abut said flanged edges, channel-shaped strips secured about the abutting edges of said wall-members and window side members, and a sash mounted in said frame with grooved lateral edges in which said strips are received, said strips being adapted to operate as sash guides and also as weather-strips, substantially as set forth.

This specification signed and witnessed this 10th day of July, 1913.

VICTOR von SCHLEGELL.

Witnesses:
MARY B. JUSTICE,
R. L. MELLOR.